US008840182B2

(12) United States Patent
Onji

(10) Patent No.: US 8,840,182 B2
(45) Date of Patent: Sep. 23, 2014

(54) SEAT STRUCTURE

(75) Inventor: Atsushi Onji, Fuchu-cho (JP)

(73) Assignee: Kyocera Document Solutions, Inc. (JP)

( * ) Notice: Subject to any disclaimer, the term of this patent is extended or adjusted under 35 U.S.C. 154(b) by 412 days.

(21) Appl. No.: 13/299,565

(22) Filed: Nov. 18, 2011

(65) Prior Publication Data

US 2012/0146373 A1 Jun. 14, 2012

(30) Foreign Application Priority Data

Dec. 9, 2010 (JP) ................................ 2010-274275

(51) Int. Cl.
*A47C 15/00* (2006.01)
*B60N 2/06* (2006.01)
*B60N 2/48* (2006.01)

(52) U.S. Cl.
CPC .............. *B60N 2/4867* (2013.01); *B60N 2/062* (2013.01); *B60N 2205/35* (2013.01); *B60N 2/065* (2013.01)
USPC ........... 297/233; 297/248; 297/249; 297/257; 297/391; 297/406

(58) Field of Classification Search
CPC .... B60N 2/0292; B60N 2/062; B60N 2/4808; B60N 2/4802; B60N 2/01; B60N 2/065
USPC ......... 297/233, 248, 249, 257, 391, 396, 404, 297/406, 407, 410
See application file for complete search history.

(56) References Cited

U.S. PATENT DOCUMENTS 5,611,589 A * 3/1997 Fujii et al. ........................ 296/64
6,076,768 A * 6/2000 Durand et al. ............. 244/118.6
7,980,617 B2 * 7/2011 Brncick et al. .................. 296/64
2002/0190550 A1 * 12/2002 Huang .......................... 297/248
2003/0234551 A1 12/2003 Taguchi et al.
2008/0185894 A1 * 8/2008 Yetukuri et al. .............. 297/406
2010/0102585 A1 * 4/2010 Kato et al. ................. 296/24.34
2011/0012386 A1 * 1/2011 Brncick et al. .................. 296/64

FOREIGN PATENT DOCUMENTS

GB 2155775 10/1985
JP 11-189082 7/1999
JP 11189082 7/1999

OTHER PUBLICATIONS

European Office Action—Oct. 6, 2014.

* cited by examiner

*Primary Examiner* — Laurie Cranmer
(74) *Attorney, Agent, or Firm* — Gerald E. Hespos; Michael J. Porco; Matthew T. Hespos

(57) ABSTRACT

A seat structure has a right seat (1R) and a left seat (1L) configured to allow three passengers to be seated, respectively, in the left seat (1L), the right seat (1R), and a region striding across a boundary between the right and left seats (1R, 1L). The left seat (1L) can be slid leftward (L) to allow the right and left seats (1R, 1L) to become spaced apart to create a walk-through space (S) therebetween. A headrest (1*c*) for a middle seat passenger seated in the region striding the boundary between the right and left seats (1R, 1L) is supported on a top of a seat back of the left seat (1L). The middle seat passenger's headrest (1*c*) can be slid leftward to unblock the walk-through space (S) when the right and left seats (1R, 1L) are in spaced-apart relation.

5 Claims, 7 Drawing Sheets

1b
B 1c 1a
1
L
1R
1L
S
L

SEAT STRUCTURE

BACKGROUND OF THE INVENTION

1. Field of the Invention

The present invention relates to a seat structure capable of creating a walk-through space.

2. Description of the Related Art

Heretofore, there has been known an automobile rear seat 30 having right and left seats 30R, 30L which are separated right and left, as illustrated in FIG. 6A. The terms "right (rightward)" and "left (leftward)" here mean directions on the basis of a seated passenger (this definition will also be applied to the following description).

A headrest 30*a* for a left seated passenger and a headrest 30*b* for a right seated passenger are supported on respective tops of the left seat 30L and the right seat 30R. As illustrated in FIG. 6B, one of the right and left seats (in this example, the right seat 30R) is turned after flipping up a seat cushion thereof, so that a walk-through space S is created between the right and left seats 30R, 30L (JP 11-189082A).

The above seat structure requires a lot of time and effort to create the walk-through space S, because it is necessary to perform both the operation of flipping up the seat cushion of the right seat 30R and the operation of turning the right seat 30R. Moreover, although the rear seat 30 is configured to, in a normal mode illustrated in FIG. 6A, allow total three passengers to be seated, respectively, in the left seat 30L, the right seat 30R, and a region striding across a boundary between the right and left seats 30R, 30L, in a side-by-side manner, it is not easy to install a headrest for a middle seat passenger who is seated in the region striding across the boundary between the right and left seats 30R, 30L (middle seat passenger's headrest).

As measures against the above problems, as illustrated in FIGS. 7A and 7B, it is contemplatable that at least one of the right and left seats, for example, the left seat 30L, is adapted to be slidably moved in a leftward direction L so as to allow the right and left seats 30R, 30L to become spaced apart from each other to create a walk-through space S therebetween. This seat structure requires less time and effort for creating the walk-through space S, because it is only necessary to perform the operation of slidably moving the left seat 30L.

Further, it is contemplatable to install a middle seat passenger's headrest 30*c* (a headrest 30*c* for a middle seat passenger who is seated in the region striding across the boundary between the right and left seats 30R, 30L) in such a manner that it is supported on a top a seat back of one of the right and left seats, for example, the left seat 30L.

However, as illustrated in FIG. 7B, when the left seat 30L is slidably moved in the leftward direction L so as to allow the right and left seats 30R, 30L to become spaced apart from each other to create a walk-through space (S) therebetween, the middle seat passenger's headrest 30*c* is in a position where a right half thereof protrudes into the walk-through space S.

Thus, the middle seat passenger's headrest 30*c* blocks a passenger from passing through the walk-through space S, so that there remains a need for improving this point.

In view of meeting the above need, it is an object of the present invention to provide a seat structure contrived such that it can be equipped with a middle seat passenger's headrest, while avoiding a situation where the middle seat passenger's headrest blocks a passenger from passing through a walk-through space.

SUMMARY OF THE INVENTION

In order to achieve the above object, the present invention provides a seat structure for a vehicle, which is configured to allow three passengers to be seated side-by-side therein. The seat structure comprises a right seat and a left seat which are separated right and left, and a headrest for a middle seat passenger who is seated in a region striding across a boundary between the right and left seats. At least one of the right and left seats is slidably moved in a rightward-leftward or frontward-rearward direction so as to allow the right and left seats to become spaced apart from each other to create a walk-through space therebetween, and the middle seat passenger's headrest is supported on a seat back of one of the right and left seats, and when the right and left seats are in spaced-apart relation, is slidably moved in a rightward or leftward direction causing the walk-through space to become unblocked.

Specifically, the present invention is directed to a seat structure comprising a right seat and a left seat which are separated right and left, wherein at least one of the right and left seats is adapted to be slidably moved in a rightward-leftward or frontward-rearward direction so as to allow the right and left seats to become spaced apart from each other to create a walk-through space therebetween.

In this seat structure, a headrest for a middle seat passenger who is seated in a region striding across a boundary between the right and left seats is supported on a top of a seat back of one of the right and left seat, so that the middle seat passenger can use a headrest in the same manner as that for right and left seated passengers.

As one example, assuming that a left one of the right and left seats is adapted to be slidably moved in the leftward direction, and the middle seat passenger's headrest is supported on a top of the left seat, when a walk-through space is created between the right and left seats disposed in spaced-apart relation, the middle seat passenger's headrest is in a protruded position (protruded state) where a right half thereof protrudes into the walk-through space. The middle seat passenger's headrest, when the right and left seats are in spaced-apart relation, is slidably moved in the leftward direction to a retracted position (withdrawn state) so as to cause the walk-through space to become unblocked. Thus, although the seat structure is equipped with the middle seat passenger's headrest, the middle seat passenger's headrest can be slidably moved through a simple manual operation to avoid the situation where it blocks a passenger from passing through the walk-through space.

These and other objects, features and advantages of the invention will become more apparent upon reading the following detailed description along with the accompanying drawings.

BRIEF DESCRIPTION OF THE DRAWINGS

FIGS. 1A to 1C illustrate an automobile rear seat (seat structure) according to one embodiment of the present invention, wherein FIG. 1A is a front view of the rear seat in a normal mode where no walk-through space is created, and FIGS. 1B and 1C are front views of the rear seat in a walk-through mode where a walk-through space is created.

FIGS. 6A and 6B illustrate a conventional seat structure, wherein FIG. 6A is a perspective view, and FIG. 6B is a top plan view.

FIGS. 7A and 7B illustrate a conventional seat structure comprising a right seat and a left seat, wherein FIG. 7A is a front view of a state in which the right and left seats are at adjacent positions, and FIG. 7B is a front view of a state in which the left seat is slidably moved in a leftward direction to create a walk-through space.

DETAILED DESCRIPTION OF THE PREFERRED EMBODIMENTS

Figure 1A:
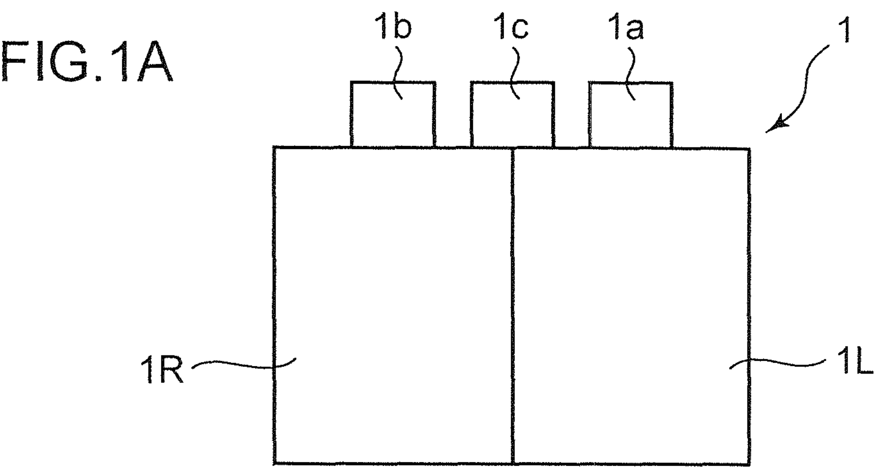
Figure 1B:
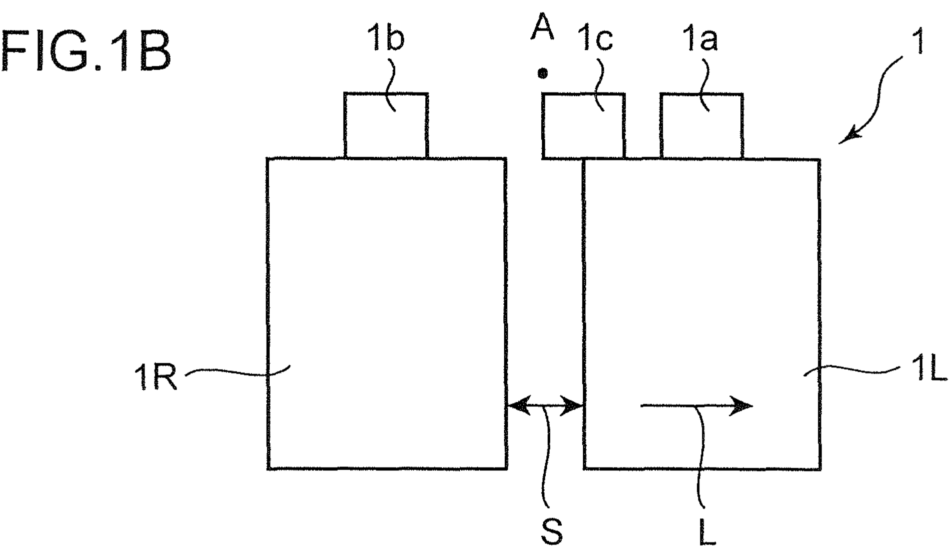
Figure 1C:
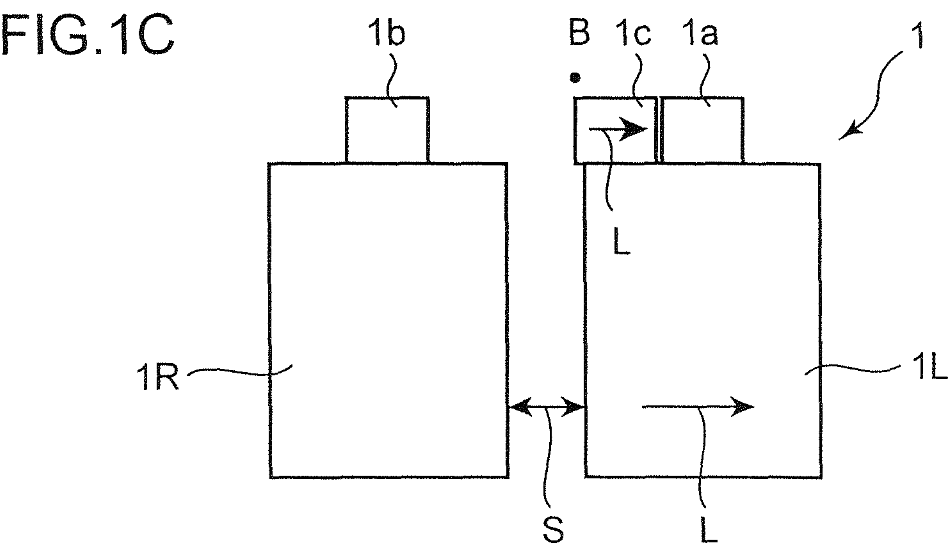

With reference to the drawings, the present invention will now be specifically described based on an embodiment thereof. FIGS. 1A to 1C illustrate an automobile rear seat structure 1 according to one embodiment of the present invention, wherein FIG. 1A is a front view of the rear seat structure in a normal mode where no walk-through space is created, and FIGS. 1B and 1C are front views of the rear seat structure in a walk-through mode where a walk-through space S is created.

The rear seat structure 1 comprises a right seat 1R and a left seat 1L which are separated right and left, for example, at a split ratio of 5:5. The rear seat structure 1 is configured to, in the normal mode, allow total three passengers to be seated, respectively, in the left seat 1L, the right seat 1R, and a region striding across a boundary between the right and left seats 1R, 1L, in a side-by-side manner.

A headrest 1*a* for a left seated passenger and a headrest 1*b* for a right seated passenger are supported on respective tops of the left seat 1L and the right seat 1R. Further, a headrest 1*c* for a middle seat passenger who is seated in a region striding across a boundary between the right and left seats 1R, 1L (middle seat passenger's headrest 1*c*) is supported on a top of a seat back of one of the right and left seats 1R, 1L (in this embodiment, the left seat 1L).

Then, as illustrated in FIG. 1B, one of the right and left seats 1R, 1L (in this embodiment, the left seat 1L) is slidably moved from a position illustrated in FIG. 1A in a leftward direction L, so that the right and left seats 1R, 1L become spaced apart from each other to create a walk-through space S therebetween.

In this walk-through mode, as illustrated in FIG. 1B, the middle seat passenger's headrest 1*c* supported on the top of the left seat 1L is in a protruded position A (protruded state) where a right half thereof protrudes into the walk-through space S. Thus, the middle seat passenger's headrest 1*c* blocks a passenger from passing through the walk-through space S.

Therefore, as illustrated in FIG. 1C, the middle seat passenger's headrest 1*c* is adapted, when the right and left seats 1R, 1L are in spaced-apart relation, to be slidably moved in the leftward direction L to a retracted position B (withdrawn state) so as to cause the walk-through space S to become unblocked. It is understood that, in cases where the middle seat passenger's headrest 1*c* is supported on the top of the right seat 1L, it is adapted to be slidably moved in a rightward direction R.

A specific structure for allowing the middle seat passenger's headrest 1*c* to be slidably moved in the leftward direction L will be described below.

Figure 2A:
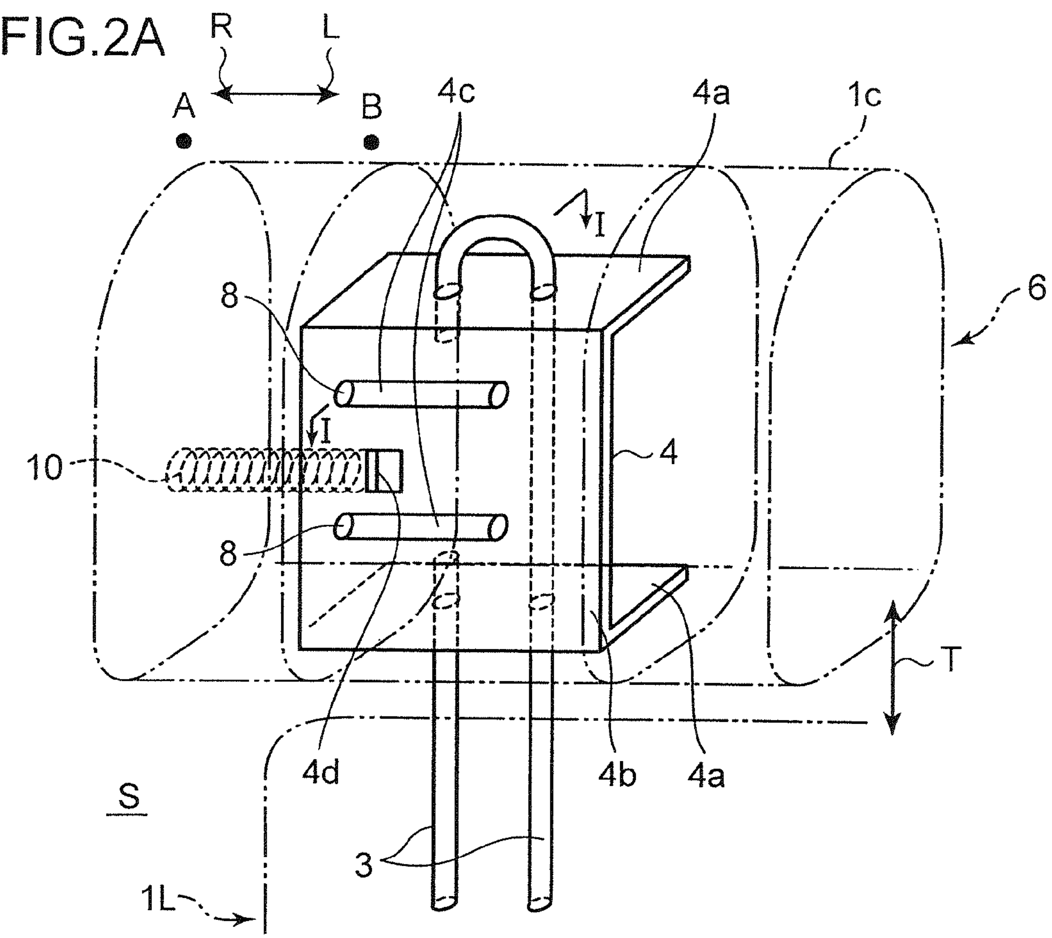
FIG. 2A is an internal perspective view of a middle seat passenger's headrest.

As illustrated in FIG. 2A, a left portion of the middle seat passenger's headrest 1*c* is supported on the top of the seat back of the left seat 1L in a manner capable of adjusting a position of the middle seat passenger's headrest 1*c* in an upward-downward direction T, through a pole 3, while allowing a right half of the middle seat passenger's headrest 1*c* to protrude toward the walk-through space S (see FIG. 1B).

Figure 2B:
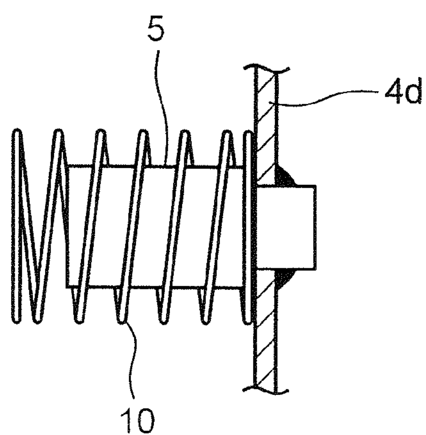
FIG. 2B is a side view of a coil spring.

A frame 4 formed in a generally angular-C shape in side view has upper and lower flange portions 4*a* which are fixed to the pole 3 of the middle seat passenger's headrest 1*c*, while allowing the pole 3 to penetrate therethrough. The frame 4 also has an upstanding portion 4*b* which is formed with a pair of upper and lower elongate guide holes 4*c* each extending in sliding (rightward and leftward) directions L, R, and a cut and raised portion 4*d* for securing a spring hanging pin 5 as illustrated in FIG. 2B. The pole 3 is partially removed in a region between the upper and lower flange portions 4*a*, in order to avoid disturbing a sliding movement of an aftermentioned guide pin 8, etc.

The frame 4 is covered with a casing-like headrest body 6 which forms an exterior of the middle seat passenger's headrest 1*c*, as indicated by the two-dot chain lines in FIG. 2A.

Figure 3A:
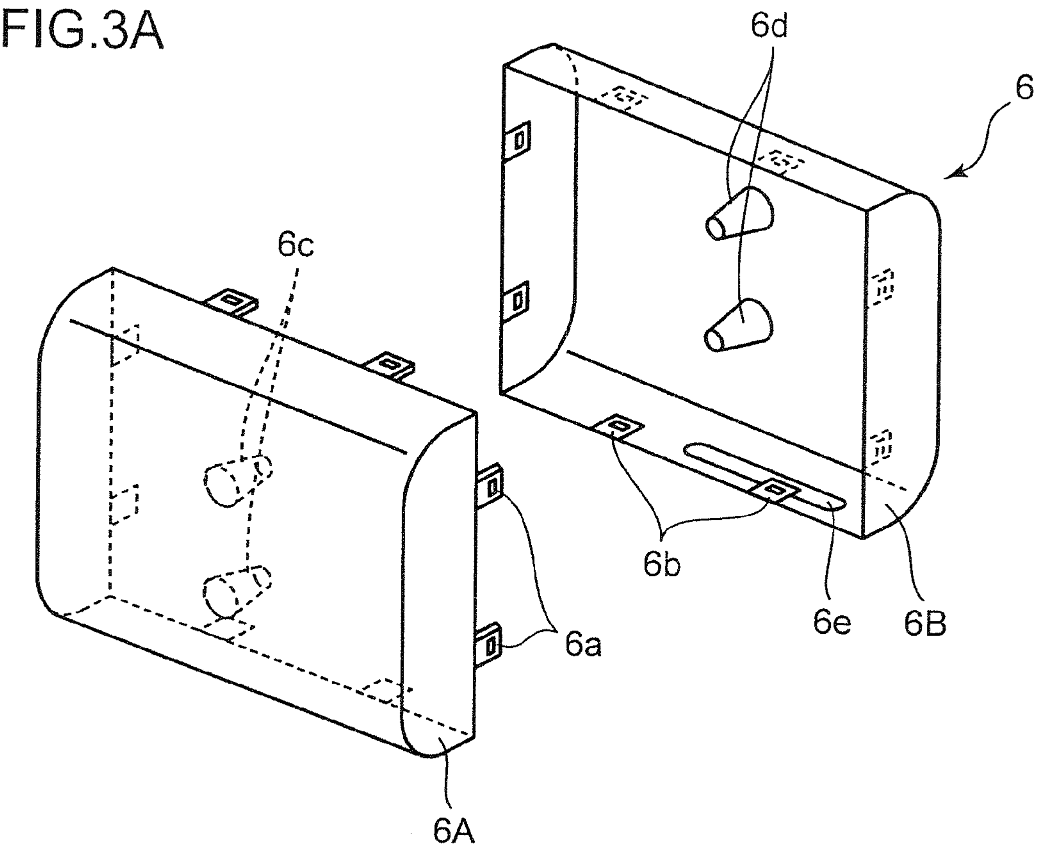
FIG. 3A is an exploded perspective view of a headrest body.

As illustrated in FIG. 3A, the headrest body 6 comprises a pair of front and rear casing bodies 6A, 6B. The front and rear casing bodies 6A, 6B can be coupled together by locking a plurality of pawls 6*a* of the front casing body 6A in respective ones of a plurality of corresponding pawl holes 6*b* of the rear casing body 6B.

The front casing body 6A has an inner surface formed with a pair of upper and lower hollow ribs 6*c* (hereinafter referred to as "first ribs") protruding rearwardly, and the rear casing body 6B has an inner surface formed with a pair of upper and lower hollow ribs 6*d* (hereinafter referred to as "second ribs") protruding frontwardly in opposed relation to respective ones of the hollow ribs 6*c* of the front casing body 6A.

Figure 4:
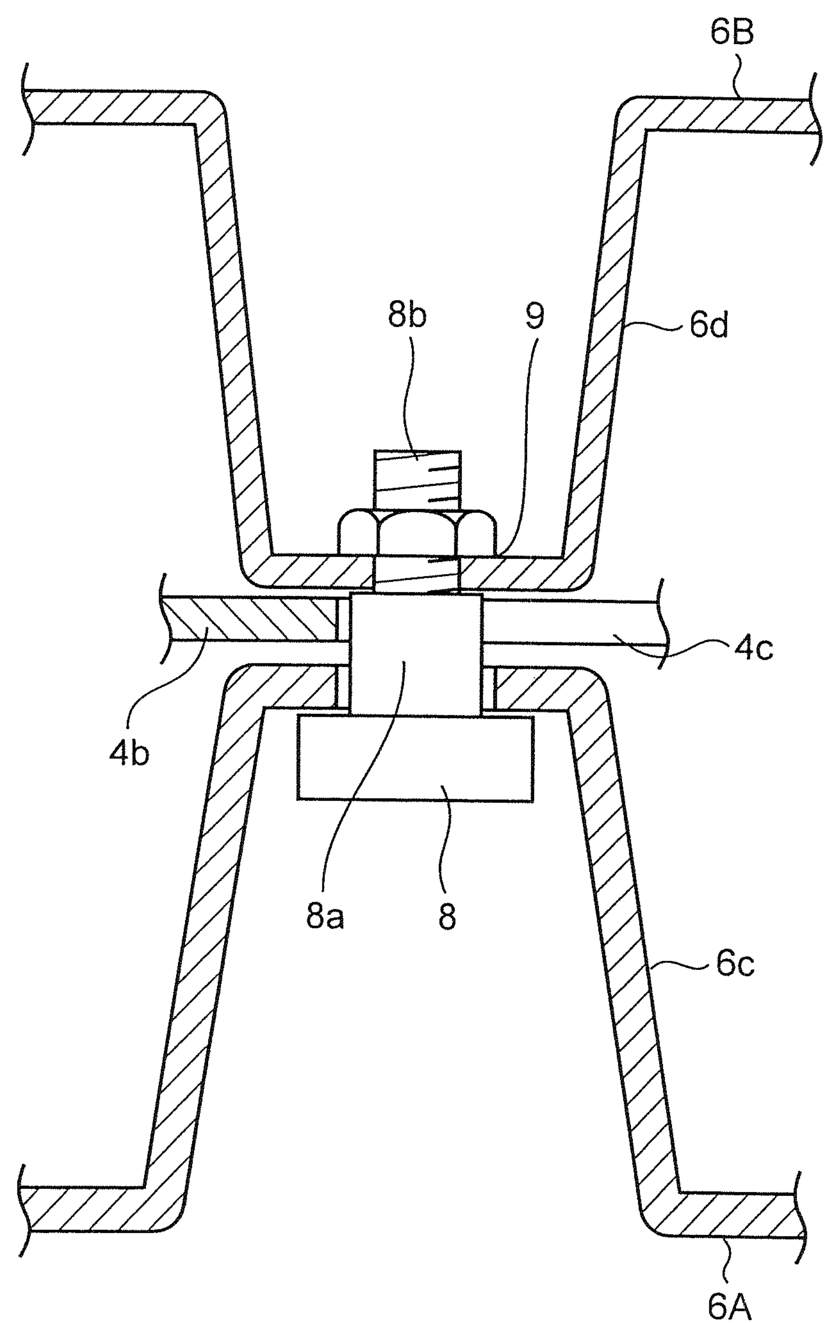
FIG. 4 is a sectional view taken along the line I-I in FIG. 2A.

In the coupled state, as illustrated in FIG. 4A, the upper hollow ribs 6*c*, 6*d* (lower hollow ribs 6*c*, 6*d*) are disposed opposed to each other while interposing the upper elongate guide hole 4*c* (lower elongate guide hole 4*c*) of the upstanding portion 4*b* of the frame 4.

Then, a stepped bolt-like guide pin 8 is inserted from the side of an outer opening of the hollow rib 6*c* of the front casing body 6*a*, to allow a stepped portion 8*a* of the guide pin 8 to penetrate through the elongate guide hole 4*c*, and a nut 9 is screwed onto a threaded portion 8*b* of the guide pin 8 from the side of an outer opening of the corresponding hollow rib 6*d* of the rear casing body 6B.

Thus, each of the guide pins 8 is slidably guided in a rightward-leftward direction by a respective one of the elongate guide holes 4*c* of the frame 4, so that the casing bodies 6A, 6B assembled together in the above manner, i.e., the headrest body 6, can be slidably moved in the rightward-leftward direction. In addition, a large load applied to the headrest body 6 can be received by the guide pins 8. With a view to allowing the casing bodies 6A, 6B to be slidably moved in a smooth manner, the number of the guide pins 8 may be increased, for example.

As illustrated in FIG. 3A, the rear casing body 6B has a lower portion formed with an elongate hole 6*e* for the pole 3. The elongate hole 6*e* is designed to allow the headrest body 6 to be slidably moved in the rightward-leftward direction without interference with the pole 3.

A coil spring (biasing member) 10 is interposed between the spring hanging pin 5 of the frame 4 and a right inner surface of the headrest body 6 (casing bodies 6A, 6B), to bias the headrest body 6 toward the walk-through space S.

Figure 3B:
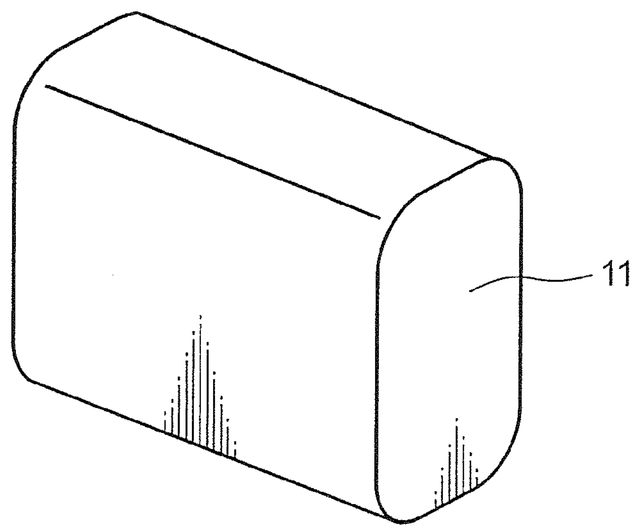
FIG. 3B is a perspective view of a trim.

An outer surface of the casing bodies 6A, 6B is covered with a decorative trim 11 as illustrated in FIG. 3B.

In the automobile rear seat structure 1 constructed as above, in the normal mode, the left seat 1L is set in a position adjacent to the right seat 1R, as illustrated in FIG. 1A. In the normal mode, the middle seat passenger's headrest 1*c* is biased in the rightward direction R by the coil spring 10, and the guide pins 8 are brought into contact with and stopped by respective right ends of the elongate guide holes 4*c*, as illustrated in FIG. 2A. Thus, the middle seat passenger's headrest 1*c* is held in a position where it is usable by a middle seat passenger who is seated in the region striding across the boundary between the right and left seats 1R, 1L, as illustrated in FIGS. 1A and 2A.

In the walk-through mode where the left seat 1L is slidably moved from the position illustrated in FIG. 1A in the leftward direction L so as to allow the right and left seats 1R, 1L to become spaced apart from each other to create the walk-through space S therebetween as illustrated in FIG. 1B, the middle seat passenger's headrest 1*c* is in the protruded position A where approximately a right half thereof protrudes into the walk-through space S.

In the walk-through mode, i.e., when the right and left seats 1R, 1L are in spaced-apart relation, the middle seat passenger's headrest 1*c* can be manually operated to be slidably moved in the leftward direction L against a biasing force of the coil spring 10 to the retracted position B where the right half of the middle seat passenger's headrest 1*c* is slidably moved from the walk-through space S onto the left seat 1L. Thus, only through the manual operation of slidably moving the middle seat passenger's headrest 1*c* in the leftward direction L, the walk-through space S can be placed in an opened or unblocked state easily and quickly, so that it becomes possible to avoid the situation where the middle seat passenger's headrest 1*c* blocks a passenger from passing through the walk-through space S. In addition, when the passenger releases his/her hand from the middle seat passenger's headrest 1*c*, it will be automatically returned to the protruded position (use position) A according to the biasing force of the coil spring 10. This makes it possible to eliminate a situation where the middle seat passenger's headrest 1*c* is not returned due to negligence when the left seat 1L is returned to the position adjacent to the right seat 1R.

The guide pins 8 of headrest body 6 are adapted to be slidably guided by respective ones of the elongate guide holes 4*c* of the frame 4 which is supported on the top of the seat back of the left seat 1L by the pole 3. Further, the headrest body 6 is biased toward the walk-through space S by the coil spring 10 interposed between the frame 4 and the headrest body 6. This makes it possible to facilitate structural simplification and cost reduction.

Figure 5A:
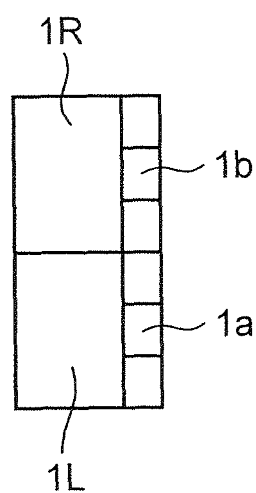
FIGS. 5A and 5B are top plan views of a seat structure of a type in which one of two seats is slidably moved in a rearward direction to create a walk-through space.
Figure 5B:
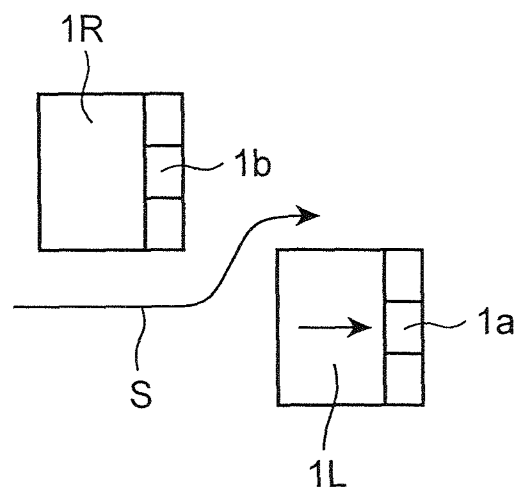
Figure 6A:
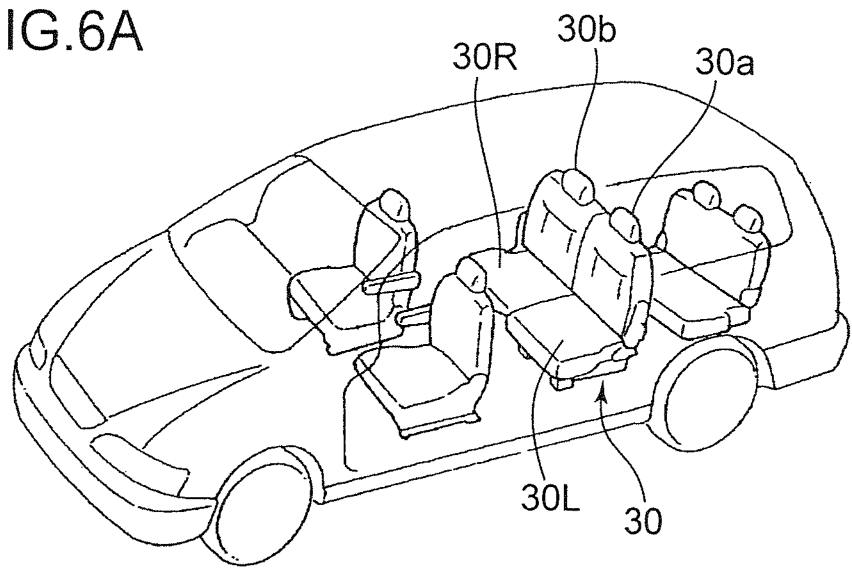
Figure 6B:
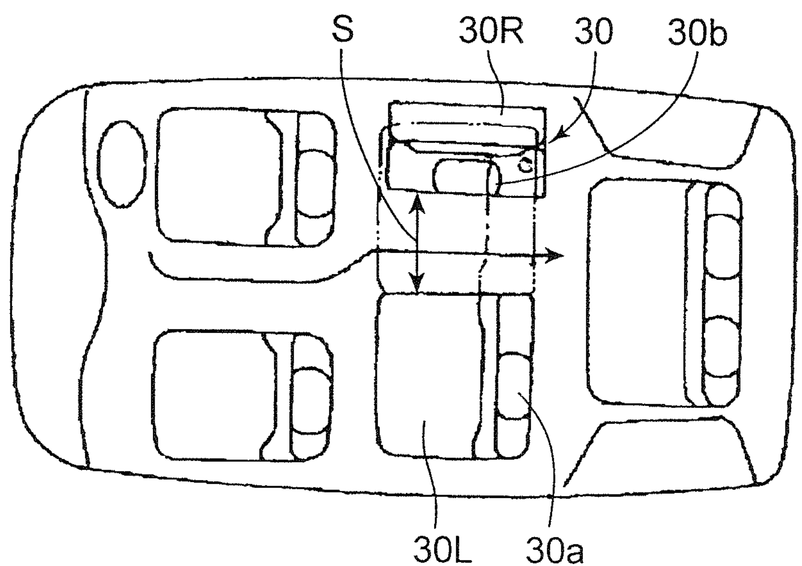
Figure 7A:
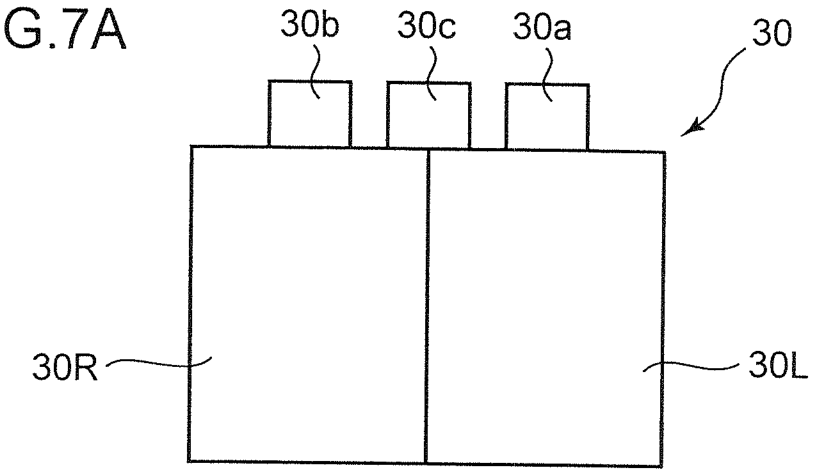
Figure 7B:
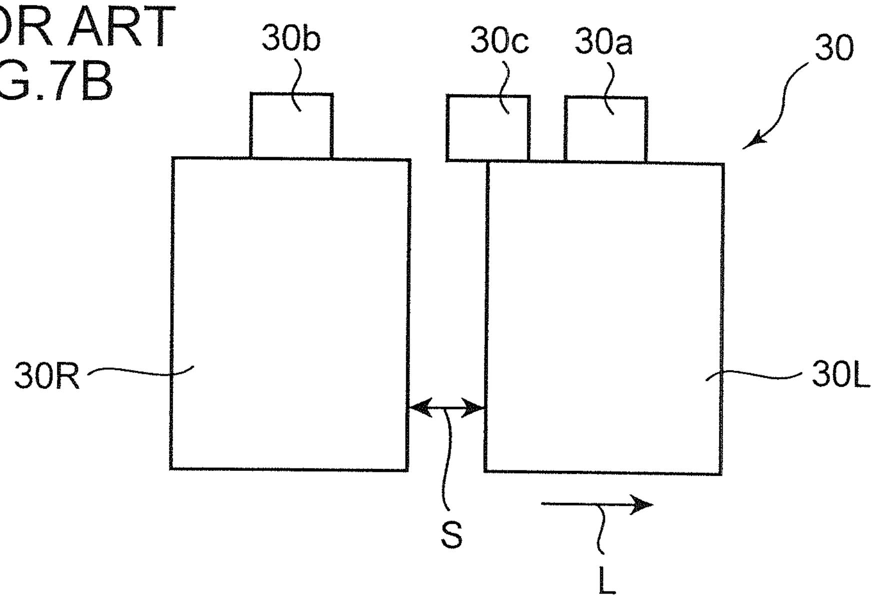

The rear seat structure according to the above embodiment is designed such that the left seat 1L is slidably moved in the leftward direction L so as to allow the right and left seats 1R, 1L to become spaced apart from each other to create a walk-through space S therebetween. Alternatively, the present invention may also be applied to a seat structure in which the left seat 1L is adapted to be slidably moved in a rearward direction as to allow the right and left seats 1R, 1L to become spaced apart from each other to create a walk-through space S therebetween, as illustrated in FIGS. 5A and 5B.

Outline of the Above Embodiment

The present invention provides a seat structure (1) for a vehicle, which is configured to allow three passengers to be seated side-by-side therein. The seat structure (1) comprises a right seat (1R) and a left seat (1L) which are separated right and left, and a headrest (1*c*) for a middle seat passenger who is seated in a region striding across a boundary between the right and left seats (1R, 1L). At least one of the right and left seats (1R, 1L) is slidably moved in a rightward-leftward or frontward-rearward direction so as to allow the right and left seats to become spaced apart from each other to create a walk-through space (S) therebetween, and the middle seat passenger's headrest (1*c*) is supported on a seat back of one of the right and left seats, and, when the right and left seats are in spaced-apart relation, is slidably moved in a rightward or leftward direction causing the walk-through space (S) to become unblocked.

Specifically, the present invention is directed to a seat structure comprising a right seat and a left seat which are separated right and left, wherein at least one of the right and left seats is adapted to be slidably moved in a rightward-leftward or frontward-rearward direction so as to allow the right and left seats to become spaced apart from each other to create a walk-through space therebetween.

In this seat structure, a headrest for a middle seat passenger who is seated in a region striding across a boundary between the right and left seats is supported on a top of a seat back of one of the right and left seat, so that the middle seat passenger can use a headrest in the same manner as that for right and left seated passengers.

When a walk-through space is created between the right and left seats disposed in spaced-apart relation, the middle seat passenger's headrest is in a protruded position where a right half or a left half thereof protrudes into the walk-through space. The middle seat passenger's headrest is adapted, when the right and left seats are in spaced-apart relation, to be slidably moved in a rightward or leftward direction to a retracted position so as to cause the walk-through space to become unblocked. Thus, although the seat structure is equipped with the middle seat passenger's headrest, the middle seat passenger's headrest can be slidably moved through a simple manual operation to avoid a situation where it blocks a passenger from passing through the walk-through space.

Preferably, the seat structure of the present invention comprises a biasing member (10) which biases the middle seat passenger's headrest (1*c*) toward the walk-through space (S), wherein the middle seat passenger's headrest (1*c*) is adapted to be manually operated to be slidably moved in the rightward or leftward direction against a biasing force of the biasing member.

According to this feature, the middle seat passenger's headrest is adapted to be manually operated to be slidably moved in the rightward or leftward direction against a biasing force of the biasing member, so that it becomes possible to unblock the walk-through space S easily and quickly. In addition, when a passenger releases his/her hand from the middle seat passenger's headrest 1*c*, it will be automatically returned to a use position according to the biasing force of the biasing member. This makes it possible to eliminate a situation where the middle seat passenger's headrest is not returned due to negligence when the left seat is returned to a position adjacent to the right seat.

More preferably, only one of the right and left seats (1R, 1L) is adapted to be slidably moved in the rightward-leftward direction, wherein the middle seat passenger's headrest (1*c*) is mounted to the slidably movable seat (1L), and the biasing member (10) biases the middle seat passenger's headrest to protrude toward the immovable seat (1R) by a given distance (e.g., about a half of a dimension of the middle seat passenger's headrest (1*c*) in the rightward-leftward direction).

In a seat structure, as in the above structure, where one of the right and left seats is adapted to be slidingly moved in the rightward-leftward direction, instead of in the frontward-rearward direction, a walk-through space can be more effectively ensured by moving the middle seat passenger's headrest from a protruded position (where it protrudes toward the immovable seat by a given distance) to a retracted position (where it does not protrude from a right or left end of the slidably movable seat, or protrudes toward the immovable seat by only a small amount).

In a specific embodiment of the present invention, the seat structure comprises: a pole (3) fixed to an upper portion of the seat back of the one of the right and left seats; and a frame (4) fixed to the pole (3) and formed with an elongate guide hole (4*c*) extending in the rightward-leftward direction. The middle seat passenger's headrest (1*c*) has right and left portions in the rightward-leftward direction, wherein one of the right and left portions is supported by the pole (3), while allowing a remaining one of the right and left portions to protrude toward the walk-through space (S). The frame (4) is covered with a headrest body (6) which forms an exterior of the middle seat passenger's headrest (1*c*), and the headrest body (6) has a guide pin (8) fixed thereto. The headrest body (6) is adapted to be slidably moved in the rightward-leftward direction along the elongate guide hole (4*c*) of the frame (4) through the guide pin (8). Further, the biasing member (10) is interposed between the frame (4) and the headrest body (6) to bias the headrest body (6) toward the walk-through space (S).

According to this feature, the guide pin of headrest body is adapted to be slidably guided by the elongate guide hole of the frame which is supported on the top of the seat back by the pole. Further, the headrest body is biased toward the walk-through space by the biasing member interposed between the frame and the headrest body. This makes it possible to facilitate structural simplification and cost reduction.

More preferably, in the above embodiment of the present invention, the headrest body (6) comprises a front casing body (6A) and a rear casing body (6B) which are coupled together in the frontward-rearward direction, and formed with a first rib (6*c*) protruding rearwardly and a second rib (6*d*) protruding frontwardly, respectively, wherein the first rib (6*c*) and the second rib (6*d*) are configured to be in a mutually coupled state through the guide pin (8).

According to this feature, it becomes possible to easily assemble the headrest body. In addition, the guide pin is provided at a position where the front and rear casing bodies are to be held in the coupled state, in such a manner as to serve as a sliding member with respect to the elongate guide hole of the frame. This makes it possible to simplify the structure and reduce a production cost.

This application is based on Japanese Patent Application Serial No. 2010-274275, filed in Japan Patent Office on Dec. 9, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat structure for a vehicle, configured to allow three passengers to be seated side-by-side therein, comprising:

a right seat and a left seat which are separated right and left; and a headrest for a middle seat passenger who is seated in a region striding across a boundary between the right and left seats, the headrest for the middle seat passenger being supported on a seat back of one of the right and left seats, wherein:

at least one of the right and left seats is slidably moved in a rightward-leftward or frontward-rearward direction so as to allow the right and left seats to become spaced apart from each other to create a walk-through space therebetween, while leaving the headrest for the middle seat passenger projecting into the walk-through space and at least partly blocking the walk-through space; and the middle seat passenger's headrest is slidably moved in a rightward or leftward direction relative to the seat back on which the middle seat passenger's headrest is supported, thereby causing the walk-through space to become unblocked when the right and left seats are in spaced-apart relation.

2. The seat structure as defined in claim 1, further comprising a biasing member which biases the middle seat passenger's headrest toward the walk-through space, wherein the middle seat passenger's headrest is manually operated to be slidably moved in the rightward or leftward direction against a biasing force of the biasing member.

3. The seat structure as defined in claim 2, wherein only one of the right and left seats is adapted to be slidably moved in the rightward-leftward direction, and wherein;

the middle seat passenger's headrest is mounted to the slidably movable seat; and the biasing member biases the middle seat passenger's headrest to protrude toward the immovable seat by a given distance.

4. The seat structure as defined in claim 2, further comprising:

a pole fixed to an upper portion of the seat back of the one of the right and left seats; and a frame fixed to the pole and formed with an elongate guide hole extending in the rightward-leftward direction, wherein:

the middle seat passenger's headrest has right and left portions in the rightward-leftward direction, wherein one of the right and left portions is supported by the pole, while allowing a remaining one of the right and left portions to protrude toward the walk-through space;

the frame is covered with a headrest body which forms an exterior of the middle seat passenger's headrest, and said headrest body has a guide pin fixed thereto, the headrest body being adapted to be slidably moved in the rightward-leftward direction along the elongate guide hole of the frame through the guide pin; and the biasing member is interposed between the frame and the headrest body to bias the headrest body toward the walk-through space.

5. The seat structure as defined in claim 4, wherein the headrest body comprises a front casing body and a rear casing body which are coupled together in the frontward-rearward direction, and formed with a first rib protruding rearwardly and a second rib protruding frontwardly, respectively, the first rib and the second rib being configured to be in a mutually coupled state through the guide pin.

* * * * *